United States Patent
Sheridan et al.

(10) Patent No.: US 9,885,282 B2
(45) Date of Patent: Feb. 6, 2018

(54) TURBOFAN ENGINE BEARING AND GEARBOX ARRANGEMENT

(71) Applicant: United Technologies Corporation, Hartford, CT (US)

(72) Inventors: William G. Sheridan, Southington, CT (US); Michael E. McCune, Colchester, CT (US)

(73) Assignee: United Technologies Corporation, Farmington, CT (US)

(*) Notice: Subject to any disclaimer, the term of this patent is extended or adjusted under 35 U.S.C. 154(b) by 902 days.

(21) Appl. No.: 14/207,718

(22) Filed: Mar. 13, 2014

(65) Prior Publication Data

US 2014/0271135 A1 Sep. 18, 2014

Related U.S. Application Data

(60) Provisional application No. 61/789,193, filed on Mar. 15, 2013.

(51) Int. Cl.
| | |
|---|---|
| *F02C 3/107* | (2006.01) |
| *F02C 7/36* | (2006.01) |
| *F02K 3/06* | (2006.01) |
| *F02C 7/06* | (2006.01) |

(52) U.S. Cl.
CPC ............ *F02C 3/107* (2013.01); *F02C 7/06* (2013.01); *F02C 7/36* (2013.01); *F02K 3/06* (2013.01); *F05D 2260/403* (2013.01); *F05D 2260/4031* (2013.01)

(58) Field of Classification Search
CPC .... F01D 25/16; F01D 5/02; F02C 7/06; F02C 3/107; F02K 3/06
See application file for complete search history.

(56) References Cited

U.S. PATENT DOCUMENTS

| | | | |
|---|---|---|---|
| 7,412,819 B2 * | 8/2008 | Bart | F01D 25/162 415/144 |
| 7,490,460 B2 | 2/2009 | Moniz et al. | |
| 7,490,461 B2 | 2/2009 | Moniz et al. | |
| 7,493,753 B2 | 2/2009 | Moniz et al. | |
| 7,603,844 B2 | 10/2009 | Moniz et al. | |

(Continued)

OTHER PUBLICATIONS

International Search Report and Written Opinion for PCT/US2014/026446, dated Jun. 25, 2014.

(Continued)

*Primary Examiner* — Woody Lee, Jr.
(74) *Attorney, Agent, or Firm* — Carlson, Gaskey & Olds, PC

(57) ABSTRACT

A turbofan engine (20) has a fan shaft (120) coupling a fan drive gear system (60) to the fan (28). A low spool comprises a low pressure turbine (50) and a low shaft (56) coupling the low pressure turbine to the fan drive gear system. A core spool comprises a high pressure turbine (46), a compressor (44), and a core shaft (52) coupling the high pressure turbine to the core spool compressor. A first bearing (150) engages the fan shaft, the first bearing being a thrust bearing. A second bearing (160) engages the fan shaft on an opposite side of the fan drive gear system from the first bearing, the second bearing being a roller bearing. A third bearing (180) engages the low spool shaft and the fan shaft.

28 Claims, 1 Drawing Sheet

(56) References Cited

U.S. PATENT DOCUMENTS

| | | | |
|---|---|---|---|
| 7,694,505 B2* | 4/2010 | Schilling | F02C 7/36 |
| | | | 60/226.1 |
| 7,726,113 B2 | 6/2010 | Orlando et al. | |
| 7,882,693 B2* | 2/2011 | Schilling | F02C 3/107 |
| | | | 60/204 |
| 2008/0098715 A1 | 5/2008 | Orlando et al. | |
| 2008/0148707 A1 | 6/2008 | Schilling | |
| 2009/0067985 A1* | 3/2009 | Dobek, Jr. | F16C 33/62 |
| | | | 415/114 |
| 2011/0123326 A1 | 5/2011 | DiBenedetto et al. | |
| 2011/0206498 A1 | 8/2011 | McCooey | |
| 2012/0251306 A1 | 10/2012 | Reinhardt et al. | |
| 2013/0025258 A1* | 1/2013 | Merry | F02C 7/06 |
| | | | 60/226.1 |
| 2013/0269479 A1 | 10/2013 | van der Merwe et al. | |

OTHER PUBLICATIONS

NASA, Technical Memorandum 83716 (AIAA-84-1500)—An Analytical Method to Predict Efficiency of Aircraft Gearboxes.
NASA Conference Publication 2077—Quiet, Powered-Lift Propulsion ("NASA 1978").
Jane's—Ivchenko Progress 727 geared turbofan, Feb. 7, 2007.
NASA—CR-159473—Quiet Clean Short-Haul Experimental Engine (QCSEE), Aug. 1979.
NASA—CR-120914—TF34 Turbofan Quiet Engine Study.

\* cited by examiner

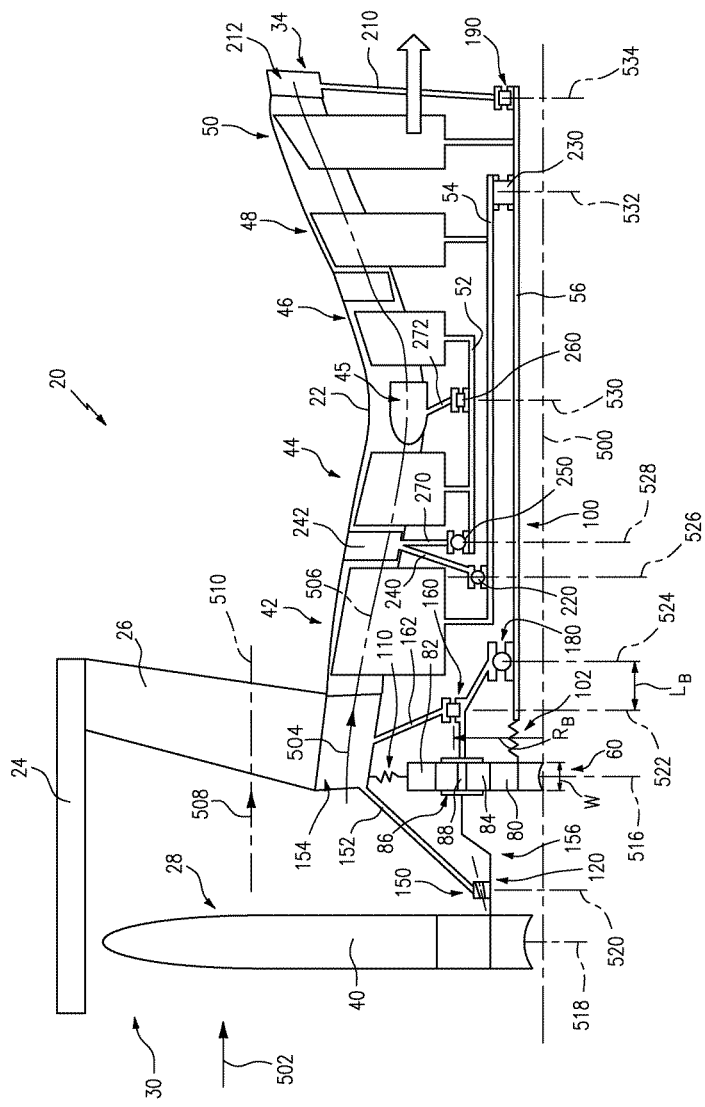

TURBOFAN ENGINE BEARING AND GEARBOX ARRANGEMENT

CROSS-REFERENCE TO RELATED APPLICATION

Benefit is claimed of U.S. Patent Application Ser. No. 61/789,193, filed Mar. 15, 2013, and entitled "Turbofan Engine Bearing and Gearbox Arrangement", the disclosure of which is incorporated by reference herein in its entirety as if set forth at length.

BACKGROUND

The disclosure relates to turbofan engines. More particularly, the disclosure relates to main bearing arrangements for turbofan engines having epicyclic gear reductions.

Gas turbine engines and similar structures feature a number of subassemblies mounted for rotation relative to a fixed case structure. Such engines have a number of main bearings reacting radial and/or thrust loads. Examples of such bearings are rolling element bearings such as ball bearings and roller bearings. Typically such bearings all react radial loads. Some such bearings also react axial (thrust) loads (either unidirectionally or bidirectionally). Ball bearings typically react thrust loads bidirectionally. However, if the inner race is configured to engage just one longitudinal side of the balls while the outer race engages the other longitudinal side, the ball bearing will react thrust unidirectionally.

Tapered roller bearings typically react thrust unidirectionally. Two oppositely-directed tapered roller bearings may be paired or "duplexed" to react thrust bidirectionally. An example is found in the fan shaft bearings of U.S. Patent Application Publication 2011/0123326A1. Such fan shaft bearings are widely spaced to behave as two distinct bearings providing radial support at two spaced locations so as to adequately react overturning moments or torques normal to the bearing axis (e.g., pitch and yaw) and thus fully support the fan. Other duplexing examples involve closely spaced bearings which behave as a single bearing and their combination may be referred to as a single duplex bearing. Such a single duplex may need to have a longitudinally spaced apart additional bearing reacting radial loads (and optionally thrust loads) for their combination to react yaw and pitch loads.

US Patent Application Publications 2013/0025257A1 and 2013/0025258A1 disclose so-called three-spool engines wherein a high pressure spool comprises a high pressure compressor (HPC) and a high pressure turbine (HPT) respectively upstream of and downstream of a combustor. An intermediate spool comprises an intermediate pressure compressor (IPC) upstream of the HPC and an intermediate pressure turbine (IPT) downstream of the HPT. A low spool comprises a low pressure turbine (LPT) downstream of the IPT and driving the fan via a fan drive gear system. The exemplary low spool comprises only the LPT and associated shaft assembly and does not include any compressor stages.

Unless explicitly or implicitly indicated otherwise, the term "bearing" designates an entire bearing system (e.g., inner race, outer race and a circumferential array of rolling elements) rather than the individual rolling elements. The term "main bearing" designates a bearing used in a gas turbine engine to support the primary rotating structures within the engine that produce thrust. This is distinguished, for example, from an accessory bearing (which is a bearing that supports rotating structures that do not produce thrust such as the fuel pump or oil pump bearings in an accessory gearbox).

SUMMARY

One aspect of the disclosure involves a turbofan engine. A fan shaft couples a fan drive gear system to the fan. A low spool comprises a low pressure turbine, and a low shaft coupling the low pressure turbine to the fan drive gear system. A core spool comprises a high pressure turbine, a compressor, and a core shaft coupling the high pressure turbine to the core spool compressor. A first bearing engages the fan shaft, the first bearing being a thrust bearing. A second bearing engages the fan shaft on an opposite side of the fan drive gear system from the first bearing. The second bearing being is a roller bearing. A third bearing engages the low spool shaft and the fan shaft.

In one or more embodiments of any of the foregoing embodiments, the third bearing is a thrust bearing.

In one or more embodiments of any of the foregoing embodiments, the first bearing is a tapered roller bearing oriented to resist at least forward movement of the fan shaft.

In one or more embodiments of any of the foregoing embodiments, the engine further comprises: a fourth bearing engaging the low spool shaft and a fixed frame; and a fifth bearing engaging the low spool shaft and an intermediate spool shaft.

In one or more embodiments of any of the foregoing embodiments, the fourth and fifth bearings are roller bearings.

In one or more embodiments of any of the foregoing embodiments, the fixed frame is aft of the low pressure turbine.

In one or more embodiments of any of the foregoing embodiments, the engine further comprises: a sixth bearing engaging the intermediate spool shaft and the case; a seventh bearing engaging the core spool shaft and the case; and an eighth bearing engaging the core spool shaft and the case.

In one or more embodiments of any of the foregoing embodiments, the sixth and seventh bearings are thrust bearings.

In one or more embodiments of any of the foregoing embodiments, the low spool shaft engages the third bearing and two additional bearings.

In one or more embodiments of any of the foregoing embodiments, a centerplane of the third bearing is behind a centerplane of the second bearing by a distance no more than 15% of a radius of the second bearing.

Another aspect of the disclosure involves a turbofan engine. A fan shaft couples a fan drive gear system having a gear carrier to the fan. A low spool comprises a low pressure turbine and a low shaft coupling the low pressure turbine to the fan drive gear system. A core spool comprises a high pressure turbine, a compressor, and a core shaft coupling the high pressure turbine to the core spool shaft. The fan shaft is mounted to rotate with the gear carrier as a unit and said unit engages a first bearing forward of the gear carrier and engages a second bearing aft of the gear carrier.

In one or more embodiments of any of the foregoing embodiments, said first bearing is a tapered roller bearing oriented to resist forward movement of the unit and said second bearing is a roller bearing engaging the unit and a fixed case structure.

In one or more embodiments of any of the foregoing embodiments, the engine further comprises a third bearing engaging the unit and the low shaft.

In one or more embodiments of any of the foregoing embodiments, a centerplane of the third bearing is behind a centerplane of the second bearing by a distance no more than 15% of a radius of the second bearing.

In one or more embodiments of any of the foregoing embodiments, the engine further comprises: a fourth bearing engaging the low spool shaft and a fixed frame; and a fifth bearing engaging the low spool shaft and an intermediate spool shaft.

In one or more embodiments of any of the foregoing embodiments, the fourth and fifth bearing are roller bearings.

In one or more embodiments of any of the foregoing embodiments, the fixed frame is aft of the low pressure turbine.

In one or more embodiments of any of the foregoing embodiments, the engine further comprises: a sixth bearing engaging the intermediate spool shaft and the case; a seventh bearing engaging the core spool shaft and the case; and an eighth bearing engaging the core spool shaft and the case.

In one or more embodiments of any of the foregoing embodiments, the sixth and seventh bearings are thrust bearings.

In one or more embodiments of any of the foregoing embodiments, the first bearing is thrust bearing and the second bearing is roller bearing.

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 1 is a schematic longitudinal sectional view of a turbofan engine.

Like reference numbers and designations in the various drawings indicate like elements.

DETAILED DESCRIPTION

FIG. 1 shows a turbofan engine 20 having a central longitudinal axis or centerline 500. The engine has a structural case including a core case 22. The exemplary structural case further comprises a fan case 24 connected to the core case by a circumferential array of struts 26 and surrounding the fan 28. The core case and the fan case may have respective outboard aerodynamic nacelles (not shown).

The exemplary forward rim of the fan case is proximate an engine inlet 30 receiving an inlet flow 502 when the engine is operating. The inlet flow passes downstream through the fan 28 and divides into a core flow 504 passing inboard along a core flowpath 506 within the core case and a bypass flow 508 passing outboard along a bypass flowpath 510 between the core case 22 and the fan case 24.

The core flow 504 (or a major portion thereof allowing for bleeds, etc.) passes sequentially through one or more compressor sections, a combustor, and one or more turbine sections before exiting a core outlet 34. In the exemplary engine the fan is a single-stage fan having a single stage of fan blades 40. Each of the compressor and turbine sections may include one or more blade stages mounted to rotate as a unit about the centerline 500. The blade stages may be alternatingly interspersed with vane stages. Each compressor section is co-spooled with an associated turbine section. From upstream to downstream along the core flowpath, the exemplary engine has two compressor sections 42 and 44, the combustor 45, and three turbine sections 46, 48, and 50.

The fan and compressor sections (and their stages) progressively compress inlet air which passes into the combustor for combustion with fuel to generate high pressure gas which passes downstream through the turbine sections where the gas pressure is progressively reduced as work is extracted. The turbine section 46 operates at highest pressure and is often referred to as a high pressure turbine (HPT) or a core turbine. The HPT blade stages are connected via a shaft 52 ("high shaft" or "core shaft") to the blade stages of the compressor section 44 to drive that compressor section (often referred to as a high pressure compressor (HPC) or core compressor) to form a high spool or core spool.

The turbine section 48 operates at an intermediate pressure range and is thus often referred to as an intermediate pressure turbine (IPT). The IPT blade stages are connected via a shaft 54 ("intermediate shaft") to the compressor section 42 to drive that compressor section (often referred to as an intermediate pressure compressor (IPC)) to form an intermediate spool.

The turbine section 50 operates at a low pressure range and is thus often referred to as a low pressure turbine (LPT). The LPT blade stages are connected via a shaft 56 ("low shaft") to a transmission 60 (e.g., an epicyclic transmission, more particularly a geared system known as a fan drive gear system (FDGS)) to indirectly drive the fan 28 with a speed reduction.

An exemplary high pressure turbine 46 is a single or double stage turbine assembly; an exemplary intermediate stage turbine 48 is a single or double stage turbine assembly; an exemplary low pressure turbine 50 is a multi-stage turbine (e.g., three or more).

The exemplary transmission comprises a central externally-toothed sun gear 80. The sun gear 80 is encircled by an internally-toothed ring gear 82. A number of externally-toothed star or planet gears 84 are positioned between and enmeshed with the sun gear 80 and ring gear 82. The star or planet gears 84 can be referred to as intermediate gears. A cage or carrier assembly 86 carries the intermediate gears via associated bearings 88 for rotation about respective axes. The bearings 88 may be rolling element bearings or journal bearings (e.g., having external circumferential surface portions closely accommodated within internal bore surfaces of the associated intermediate gears 84).

The exemplary carrier assembly 86 comprises a front plate (e.g., annular) in front of the gears and a rear plate (e.g., annular) behind the gears. These plates may be mechanically connected by the bearings 88 and/or by linking portions between adjacent intermediate gears.

In the exemplary embodiment, a forward end of the low shaft 56 is coupled to the sun gear 80. The exemplary low shaft 56 has a generally rigid main portion 100 and a flexible forward portion 102. A forward end of the portion 102 may have a splined outer diameter (OD) surface interfitting with a splined inner diameter (ID) surface of the sun gear 80 to transmit rotation.

The exemplary ring gear 82 is substantially non-rotatably mounted relative to the engine case. In the exemplary embodiment, the ring gear 82 is coupled to the case 22 via a compliant flexure 110 that allows at least small temporary radial and axial excursions and rotational excursions transverse to the centerline 500.

The exemplary carrier assembly 86 is coupled to the fan 28 to rotate with the fan 28 as a unit. In the exemplary embodiment a main fan shaft 120 connects the fan 28 to the carrier assembly 86.

The speed reduction ratio is determined by the ratio of diameters of the ring gear 82 to the sun gear 80. This ratio will substantially determine the maximum number of intermediate gears 84 in a given ring 82. The actual number of intermediate gears 84 will be determined by stability and stress/load sharing considerations. An exemplary reduction is between about 2:1 and about 13:1. Although only one intermediate gear 84 is necessary, in exemplary embodiments, the number of intermediate gears 84 may be between about three and about eleven. An exemplary gear layout with fixed carrier is found in U.S. Patent Application Publication 2012/0251306A1.

Thus, the exemplary engine 20 has four main rotating components (units) rotating about the centerline 500: the core spool (including the high pressure turbine 46, the high shaft 52, and the high pressure compressor 44; the intermediate spool (including the intermediate pressure turbine 48, the intermediate shaft 54, and the intermediate pressure compressor 42); the low spool (including the low pressure turbine 50 and low shaft 56); and the fan assembly (including the fan 28 itself and the fan shaft 120). Each of these four things needs to be supported against: radial movement; overturning rotations transverse to the centerline 500; and thrust loads (parallel to the axis 500). Radial and overturning movements are prevented by providing at least two main bearings engaging each of the four units. As is discussed below, such at least two are sufficiently axially spaced to resist the overturning movements.

Each unit would have to also engage at least one thrust bearing. The nature of thrust loads applied to each unit will differ. Accordingly, the properties of required thrust bearings may differ. For example, the fan 28 primarily experiences forward thrust and, therefore, the thrust bearings engaging the fan 28 may be configured to address forward thrust but need not necessarily address rearward thrusts of similar magnitudes, durations, etc.

Previously-proposed gear-reduced turbofan engines have placed two main bearings along the fan shaft forward of the transmission. The FIG. 1 embodiment, however, places only a single bearing 150 forward of the transmission 60. Inboard, the inner race of this exemplary bearing 150 engages a forward portion of the shaft 120 aft of the fan. Outboard, the outer race of the bearing 150 engages static structure of the case. The exemplary static structure comprises a support 152 extending inward from a forward frame 154.

To provide the required second bearing for the fan unit, the fan shaft effectively extends through the transmission by integrating the carrier assembly 86 into the fan shaft 120. Thus, the carrier assembly 86 is rigidly connected to a forward portion 156 of the fan shaft 120 ahead of the transmission 60 and an aft portion 158 of the fan shaft 120 aft of the transmission 60. The carrier assembly 86 and fan shaft 120 thus rotate as a unit. The exemplary fan shaft 120 aft portion 158 is supported by a bearing 160. The exemplary bearing 160 also supports the fan shaft 120 relative to the static structure (e.g., via a rear support 162 extending inward from the forward frame 154 behind the transmission 60). These two bearings 150, 160 thus prevent radial excursions and overturning moments which the fan 28 may produce during flight.

To resist thrust loads, one or both of the bearings 150, 160 may be thrust bearings. In an exemplary embodiment, the bearing 160 is a non-thrust bearing (e.g., a straight roller bearing with longitudinal roller axes configured to only handle radial loads). The other bearing (i.e., the bearing 150) is a thrust bearing. Due to the significance of forward thrust loads on the fan 28, the bearing 150 may be biased to resist forward loads. The exemplary bearing 150 is a bidirectional ball bearing or a bidirectional tapered roller bearing (e.g., wherein the rollers have a forward taper and forwardly converging roller axes to preferentially handle the forward thrust loads). A similar bidirectional tapered roller bearing is shown in U.S. Pat. No. 6,464,401 of Allard, entitled "High Load Capacity Bi-Directional Tapered Roller Bearing". Ball bearings are typically bidirectional thrust bearings. However, a unidirectional ball bearing may be formed by having at least one of the races contacting only a single longitudinal side of the balls.

An exemplary bearing arrangement for supporting the remaining three units is discussed below. Various aspects of each of these may be independently implemented or all may be implemented in a given engine. The low shaft 56 is principally supported by a forward bearing 180 and an aft bearing 190. Although the forward bearing 180 might be directly grounded to the case 22 (e.g., via a bearing support extending inward from the frame 154 aft of the support 162), the exemplary bearing 180 is indirectly grounded to the case 22 via the fan shaft 120 and bearing 160. A rearmost portion 200 of the fan shaft 120 extends aft from the inner race of the bearing 160 to the outer race of the bearing 180. Thus, radial loads to the bearing 180 are transmitted through the aft portion 200, the bearing 160, and the support 162.

The exemplary bearing 190 is grounded to the case 22 via a support 210 extending inward from a frame 212 extending across the core flowpath 504. The exemplary support 210 is aft of the LPT 50 with the frame 212 being a turbine exhaust frame. Alternative implementations may shift the support 210 forward of the LPT 50 to engage an inter-turbine frame between the turbine sections 48 and 50.

One of the bearings 180 and 190 may be a non-thrust bearing such as a roller bearing (e.g., such as a straight roller bearing) with the other being a thrust bearing. The exemplary bearing 190 is a straight roller bearing. The exemplary bearing 180 is a thrust bearing (e.g., a bidirectional ball bearing). Thus, thrust loads on the low spool are transmitted via the shaft 56 through the bearing 180, through the fan shaft 120, to the bearing 150, and grounded back through the support 152.

The intermediate spool is supported by forward bearing 220 and an aft bearing 230. In an exemplary embodiment, the forward bearing 220 directly radially supports or grounds the intermediate spool via a support 240 extending to an inter-compressor frame 242 between the compressor sections 42 and 44. Alternative embodiments might shift this support forward to the front frame 154. The bearing 230 indirectly supports or grounds the intermediate spool by engaging the intermediate spool and the low spool or, namely, engaging the intermediate shaft 54 and the low shaft 56.

With the bearing 230 more relatively near to the bearing 190 than near to the bearing 180, the radial loads on the intermediate spool at the bearing 230 will primarily be transmitted to the low shaft 56 and through an aft portion of the low shaft 56 to the bearing 190 and grounded by the support 210 and frame 212. The exemplary bearing 230 is thus a straight roller bearing transmitting essentially only radial loads. The bearing 220 is, however, a thrust bearing (e.g., a bidirectional ball bearing) which handles the thrust loads on the intermediate spool. In alternative embodiments, however, the bearing 230 could directly ground the intermediate spool by having its inner race engage the low spool and its outer race engage a support extending to an inter-turbine frame between the turbine sections 48 and 50.

A single bidirectional duplex bearing (e.g., two oppositely configured unidirectional ball or roller thrust stages) may also be used as the bearing 220 or other thrust bearing. The close positioning of the two stages may be needed to avoid problems associated with differential thermal expansion of the two bodies (spools or static structure between which the bearings radially intervene). With large gap between stages (e.g., measured as the longitudinal span between the ends of the rolling elements of the first stage and the adjacent ends of the rolling elements of the second stage) differential thermal expansion could either cause bearing disengagement or excessive thrust loads. A small gap (e.g., no more than the individual axial spans of the rolling elements of one or both stages, more broadly no more than 1.5 times twice such axial span) will avoid such problems. In an exemplary gas turbine engine, such a gap may be not more than 30 mm or not more than 25 mm. For example, the intermediate spool and high spool may be subject to greater heating than the case and thus greater thermal expansion. If one of these is supported relative to the case by two widely spaced thrust stages, differential thermal expansion may be a problem.

The core spool may be fully directly supported by two bearings 250 and 260 of which at least one would be a thrust bearing. In the exemplary embodiment, the bearing 250 is a forward bearing grounding a forward portion of the core shaft 52 ahead of the compressor section 44 to the intercompressor frame 242 via a support 270. The aft bearing 260 grounds a portion of the core shaft 52 intermediate the compressor section 44 and turbine section 46 to a combustor frame via a support 272. In alternative embodiments, this aft bearing 260 might be shifted aft of the turbine section 46 and the support 272 may extend to an inter-turbine frame between the sections 46 and 48. In the exemplary implementation, the bearing 250 is a thrust bearing (e.g., a bidirectional ball bearing with its inner race engaging the core shaft 52 and its outer race engaging the support 270). The exemplary bearing 260 is a straight roller bearing with its inner race engaging the core shaft 52 and its outer race engaging the support 272.

FIG. 1 further shows the FDGS 60 as having a centerplane 516 and the gears as having a gear width $W_G$ and the fan blade array as having a centerplane 518. From fore to aft, the bearings have respective centerplanes 520, 522, 524, 526, 528, 530, 532, and 534.

The axial tying of the fan shaft 120 to another shaft via the thrust bearing 180 may cause thrust loads from the other shaft to counter the aerodynamic thrust loads the fan 28 imparts to the fan shaft 120. This may reduce the net thrust load to be reacted by the bearing 150 and support 152 relative to a baseline engine wherein 150 (either single or duplex) is the only thrust bearing engaging the fan shaft. Thus, the thrust bearing 150 and support 152 may, in at least some embodiments, be made physically smaller (e.g., allowing the engine to be more compact) and/or lighter relative to a baseline engine of equivalent fan size or engine thrust.

The axial tying of the fan shaft 120 (output shaft) to the driving shaft (input shaft 56) by bearing 180 also may, in some embodiments, reduce the required number of bearing supports (e.g., because support 162 replaces separate supports for the two bearings 160 and 180 (or what other bearings would replace these in the hypothetical baseline or comparative engine).

In a further variation, the portion of the fan shaft 120 between the bearings 160 and 180 may be reduced (e.g., allowing bearing 180 to be nested within bearing 160) which may allow further reduction in engine length. For example, in some embodiments the centerplane of bearing 180 may be aligned with, or no more than a short distance behind, the centerplane of bearing 160 (e.g., no more than 15% of a radius of bearing 160, more particularly no more than 10% or 5% where the radius of a bearing is defined as the intersections of the rotational axes of its individual rolling elements with the bearing centerplane).

The use of "first", "second", and the like in the following claims is for differentiation within the claim only and does not necessarily indicate relative or absolute importance or temporal order or positional order. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units.

One or more embodiments have been described. Nevertheless, it will be understood that various modifications may be made. For example, when applied to an existing basic engine configuration, details of such configuration or its associated environment may influence details of particular implementations. Accordingly, other embodiments are within the scope of the following claims.

What is claimed is:

1. A turbofan engine comprising:
   a fan;
   a fan drive gear system;
   a fan shaft coupling the fan drive gear system to the fan;
   a low spool comprising:
      a low pressure turbine; and
      a low shaft coupling the low pressure turbine to the fan drive gear system;
   a core spool comprising:
      a high pressure turbine;
      a compressor; and
      a core shaft coupling the high pressure turbine to the core spool compressor;
   a first bearing engaging the fan shaft, the first bearing being a thrust bearing;
   a second bearing engaging the fan shaft on an opposite side of the fan drive gear system from the first bearing, the second bearing being a roller bearing; and
   a third bearing engaging the low spool shaft and the fan shaft.

2. The engine of claim 1 wherein:
   the third bearing is a thrust bearing.

3. The engine of claim 1 wherein:
   the first bearing is a tapered roller bearing oriented to resist at least forward movement of the fan shaft.

4. The engine of claim 1 further comprising:
   a fourth bearing engaging the low shaft and a fixed frame; and
   a fifth bearing engaging the low shaft and an intermediate spool shaft.

5. The engine of claim 4, wherein:
   the fourth bearing and fifth bearing are roller bearings.

6. The engine of claim 4 wherein:
   the fixed frame is aft of the low pressure turbine.

7. The engine of claim 4 further comprising:
   a sixth bearing engaging the intermediate spool shaft and the case;
   a seventh bearing engaging the core spool shaft and the case; and
   an eighth bearing engaging the core spool shaft and the case.

8. The engine of claim 7, wherein:
the sixth bearing and seventh bearing are thrust bearings.

9. The engine of claim 1 wherein:
the low spool shaft engages the third bearing and two additional bearings.

10. The engine of claim 1 wherein:
a centerplane of the third bearing is behind a centerplane of the second bearing by a distance no more than 15% of a radius of the second bearing.

11. A turbofan engine comprising:
a fan;
a fan drive gear system having a gear carrier; and
a fan shaft coupling the fan drive gear system to the fan;
a low spool comprising:
  a low pressure turbine; and
  a low shaft coupling the low pressure turbine to the fan drive gear system; and
a core spool comprising:
  a high pressure turbine;
  a compressor;
  a core shaft coupling the high pressure turbine to the core spool shaft,
wherein:
  the fan shaft is mounted to rotate with the gear carrier as a unit and said unit engages a first bearing forward of the gear carrier and engages a second bearing aft of the gear carrier; and
  a third bearing engaging the unit and the low shaft.

12. The engine of claim 11 wherein:
said first bearing is a tapered roller bearing oriented to resist forward movement of the unit; and
said second bearing is a roller bearing engaging the unit and a fixed case structure.

13. The engine of claim 11, wherein:
a centerplane of the third bearing is behind a centerplane of the second bearing by a distance no more than 15% of a radius of the second bearing.

14. The engine of claim 11, further comprising:
a fourth bearing engaging the low shaft and a fixed frame; and
a fifth bearing engaging the low shaft and an intermediate spool shaft.

15. The engine of claim 14, wherein:
the fourth and fifth bearing are roller bearings.

16. The engine of claim 14 wherein:
the fixed frame is aft of the low pressure turbine.

17. The engine of claim 14 further comprising:
a sixth bearing engaging the intermediate spool shaft and the case;
a seventh bearing engaging the core spool shaft and the case; and
an eighth bearing engaging the core spool shaft and the case.

18. The engine of claim 17, wherein:
the sixth bearing and seventh bearing are thrust bearings.

19. The engine of claim 11, wherein:
the first bearing is thrust bearing and the second bearing is roller bearing.

20. A turbofan engine comprising:
a fan delivering air into a bypass duct and into a core engine;
a fan drive gear system having a gear carrier; and
a fan shaft coupling the fan drive gear system to the fan and said fan shaft mounted to rotate with said gear carrier as a unit;
the core engine including a low spool comprising:
  a low pressure turbine;
  a low pressure shaft having a forward end with an outer periphery coupling the low pressure turbine to the fan drive gear system at an inner periphery of a sun gear in said fan drive gear system; and
a high spool comprising:
  a high pressure turbine;
  a compressor; and
  a high pressure shaft coupling the high pressure turbine to the compressor,
wherein:
  a first bearing forward of the fan drive gear system, and supporting said fan shaft and said fan drive gear system and a second bearing aft of the fan drive gear system, and supporting the fan drive gear system.

21. The engine of claim 20, wherein there is a flexible connection supporting said fan drive gear system relative to a static housing.

22. The engine as set forth in claim 21, wherein said high pressure turbine having one or two stages.

23. The engine as set forth in claim 22, wherein said low pressure turbine having three or more stages.

24. The engine as set forth in claim 23, wherein said low pressure shaft having a spline connection to said sun gear.

25. The engine as set forth in claim 21, wherein said low shaft has a flexible portion.

26. The engine as set forth in claim 20, wherein said high pressure turbine having one or two stages.

27. The engine as set forth in claim 26, wherein said low pressure shaft having a spline connection to said sun gear.

28. The engine as set forth in claim 20, wherein said low pressure shaft having a spline connection to said sun gear.

* * * * *